United States Patent [19]

Boland

[11] 4,084,429

[45] Apr. 18, 1978

[54] POWER TONG APPARATUS

[75] Inventor: John Gordon Boland, Wichita Falls, Tex.

[73] Assignee: Foster Cathead Corporation, Houston, Tex.

[21] Appl. No.: 682,574

[22] Filed: May 3, 1976

[51] Int. Cl.[2] .......................... B25B 23/14; G01L 5/24

[52] U.S. Cl. .......................................... 73/139; 73/99; 73/136 A; 81/57.13; 81/57.16

[58] Field of Search ............... 73/99, 134, 136 A, 137, 73/138, 139; 81/57.13, 57.16, 57.29, 57.34

[56] References Cited

U.S. PATENT DOCUMENTS

| | | | |
|---|---|---|---|
| 2,000,221 | 5/1935 | Dawson | 81/57.16 |
| 2,668,689 | 2/1954 | Cormany | 81/57.16 |
| 2,938,416 | 5/1960 | Maness | 81/57.13 |
| 3,368,396 | 2/1968 | Van Burkleo et al. | 73/139 |
| 3,518,903 | 7/1970 | Ham et al. | 81/57.16 |
| 3,555,894 | 1/1971 | Bratkowski | 73/136 A X |
| 3,589,179 | 6/1971 | Nicolau | 73/139 |
| 3,813,933 | 6/1974 | Weiss et al. | 73/139 X |
| 3,929,009 | 12/1975 | Lutz et al. | 73/136 A |

*Primary Examiner*—Richard C. Queisser
*Assistant Examiner*—Charles Gorenstein
*Attorney, Agent, or Firm*—Vinson & Elkins

[57] ABSTRACT

An improved power tong apparatus having power means for supplying rotative forces to a first tubular member in order to make or break a connection between such tubular member and a second tubular member and for measuring and displaying the torque supplied by the power tong apparatus to such tubular members. The power tong apparatus includes an internal transfer shaft means associated with the transfer shaft for transducing the angular deformation of the transfer shaft into an electrical signal representative thereof. A slip ring assembly is secured to a selected end of the transfer shaft for conducting electrical signals supplied to it. A display means is electrically connected to the slip ring assembly for receiving electrical signals produced by the transducer means.

1 Claim, 3 Drawing Figures

POWER TONG APPARATUS

BACKGROUND AND SUMMARY OF THE INVENTION

This invention relates to an apparatus for making or breaking a connection between first and second tubular members and for measuring and displaying the torque supplied by the apparatus to such tubular members to make or break the connection.

Apparatus for supplying torsion forces to tubular members in order to make or break a connection between such tubular members are well known to those skilled in the art. In the oil and gas industry, these apparatus are generally known as "power tongs." In the use of power tongs to make and break connections between tubular members, it is often desirable to measure the torque imparted to the tubular members in order to assure proper assembly of the connection and to aid inspection during disassembly to the connection. Numerous methods and apparatus have been developed for aiding in determining the torque applied to a connection by power tongs. Certain of these methods and apparatus are disclosed in the following U.S. Pat. Nos.: 2,535,667; 3,368,396; 3,589,179; 3,606,664; and 3,745,820.

It is an object of this invention to provide an improved power tong apparatus which will accurately measure the amount of torque applied to a connection between tubular members in a manner independent of the physical constraints and mounting of the power tong apparatus.

In the improved power tong apparatus according to this invention, there is provided an apparatus for supplying torsion forces to a first tubular member in order to make or break a connection between the first tubular member and a second tubular member and for measuring and displaying the torque supplied to such tubular members. The power tong apparatus includes power means for supplying rotative forces and a rotatable transfer shaft integrally connected with the power means for generating high torque forces. The power tong apparatus includes a lateral drive means which couples the transfer shaft to the first tubular member whereby the high torque forces are transmitted from the transfer shaft to the first tubular member. The power tong apparatus includes means associated with the transfer shaft for transducing the angular deformation of the transfer shaft, due to torsion, into an electrical signal representative thereof. The transducer means are associated with the transfer shaft intermediate the location at which the transfer shaft connects with the power means and the location at which the transfer shaft is coupled to the lateral drive means. A slip ring assembly is secured to a selected end of the transfer shaft for conducting electrical signals from the shaft as it rotates. Display means are electrically connected to the slip ring assembly for receiving the electrical signals generated by the transducer means and responsive thereto displaying the magnitude of the torque supplied to the first tubular member. The improved power tong apparatus according to this invention allows the operator of the power tong apparatus to measure accurately the amount of torque supplied to the connection and, since the torque is determined at a portion of the transfer shaft which is internal to the power tong apparatus, the presence or absence of a backup tool to hold the second tubular member from rotating, the mounting of the power tong apparatus on its side for pipe yard work, or the mounting of the tong at an angle, as in slant hole work, makes no difference in the measurement of the torque. Thus, the improved power tong apparatus according to this invention accurately measures the amount of torque supplied to the connection between tubular members in a manner independent of the physical constraints and mounting of the power tong apparatus.

BRIEF DESCRIPTION OF THE DRAWINGS

The preferred embodiment of the power tong apparatus according to this invention will now be described with respect to the following drawings in which like numerals represent like parts.

DESCRIPTION OF THE PREFERRED EMBODIMENT

Figure 1:
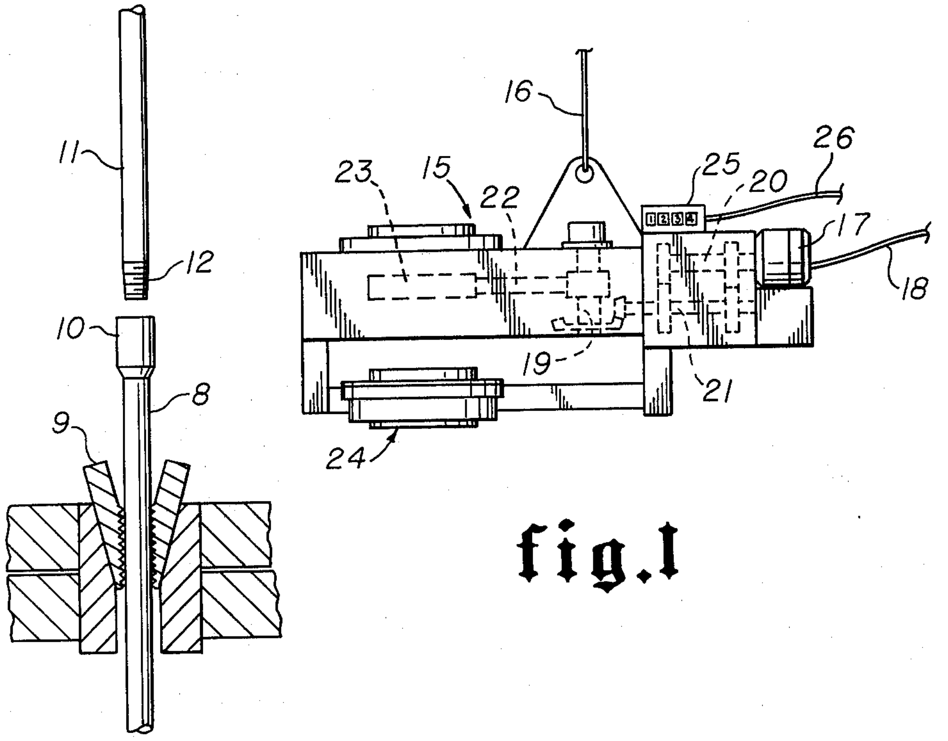
FIG. 1 is a schematic diagram, partially in section, of first and second tubular members to be threadedly connected with an improved power tong apparatus according to this invention.

With reference to FIG. 1, there is shown a typical combination of first and second tubular members, to be connected with an improved power tong apparatus according to this invention. A tubular member 8 is supported in slips 9 and hangs downwardly therefrom, with female fitting 10 upward. A second tubular member 11 is held by elevators (not shown) or the like and is lowered into position whereby its threaded male end 12 may be threadedly connected into the female end 10 of the lower tubular member 8.

The power tong apparatus shown generally at 15 is secured for lateral and vertical movement relative to the tubular members by a pivotally mounted hydraulic piston and cylinder assembly 16 or any other means well known to those skilled in the art. The improved power tong apparatus according to this invention preferably includes power means 17 for supplying rotative forces. The power means for supplying rotative forces preferably comprises a hydraulic motor to which hydraulic fluid is supplied by a flexible hose 18. The power tong apparatus preferably includes a rotatable transfer shaft 19 (shown by dotted lines in FIG. 1) which is integrally connected with the power means 17 by a drive shaft 20 and a clutch shaft 21 (also shown by dotted lines in FIG. 1). Lateral drive means 22, preferably a chain, couples the transfer shaft 19 to a selected one of the tubular members by means of gripping jaws 23 (shown by dotted lines in FIG. 1), as is well known to those skilled in the art. The power tong apparatus preferably includes another set of gripping jaws in a back-up tool 24 grasping the other tubular member and holding it against rotation. In the power tong apparatus illustrated in FIG. 1, the gripping jaws in the back-up tool 24 preferably grasp the female end 10 of the lower tubular member 8 and the rotatable gripping jaws 23 grasp the upper tubular member 11 for making and breaking the connection between the upper and lower tubular members 11 and 8, respectively. Mounted to the power tong apparatus is a display means 25 to which electrical power is supplied by a conduit 26. Display means 25 receives electrical signals generated by a transducer means as will hereinafter be explained and in response thereto displays the magnitude of the torque supplied by the power tong apparatus to the tubular members.

Figure 2:
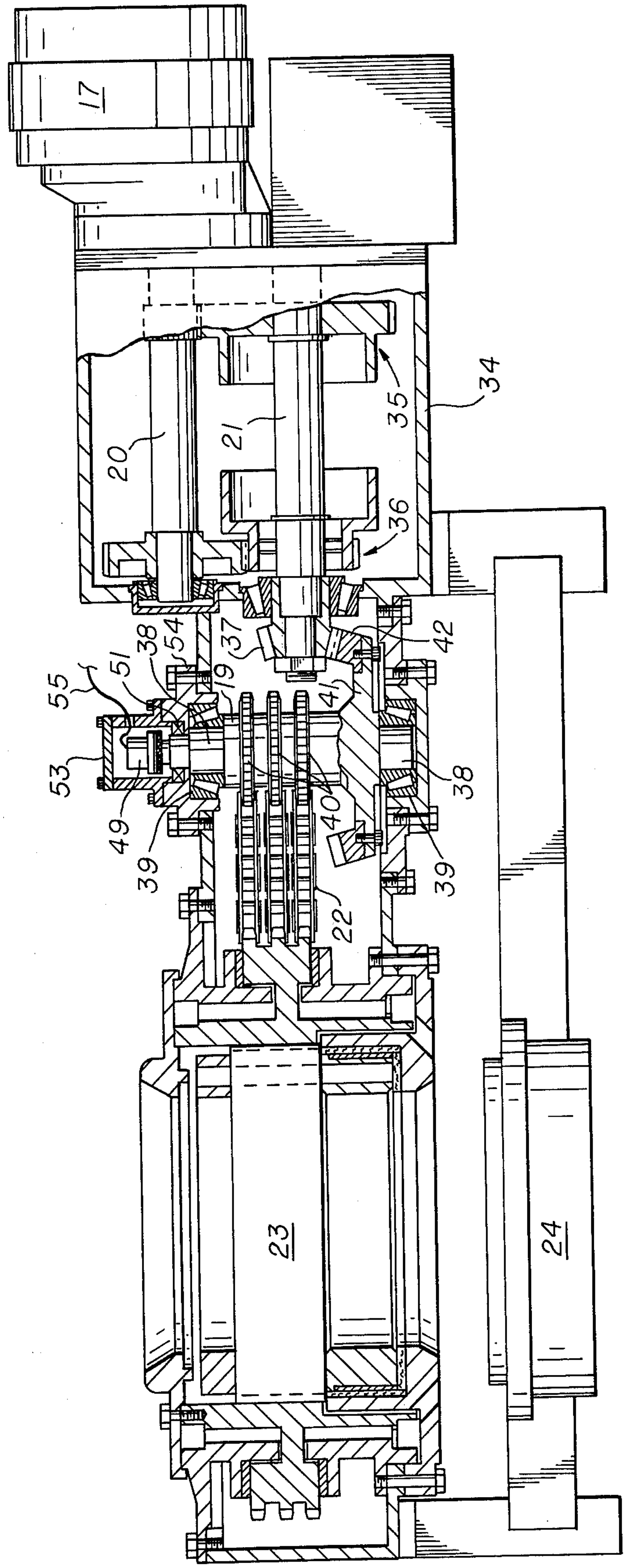
FIG. 2 is a sectional view of the mechanical portions of the improved power tong apparatus according to this invention.

Particularly, and with reference to FIG. 2, the power means 17 for supplying rotative forces are integrally connected with the rotatable transfer shaft 19 whereby the rotatable transfer shaft 19 generates high-torque forces. This connection between the power means 17 and the transfer shaft 19 preferably comprises a drive shaft 20 which is operably coupled to a clutch shaft 21 through a low gear assembly 35 or a high gear assembly 36 as is well known to those skilled in the art. The drive shaft 20 and the clutch shaft 21 are enclosed within a transmission case 34. The driving end of the clutch shaft 21 extends from the transmission case 34 into the portion of the power tong apparatus in which is mounted the rotatable transfer shaft 19.

The driving end of the clutch shaft 21 has mounted thereon a driving pinion 37. The transfer shaft 19 has a journal 38 at each end thereof which is journalled for rotary movement in a housing 39 whereby the transfer shaft revolves freely in either direction. The transfer shaft 19 forms a sprocket 40 or suitable driving member along a portion of its length. The transfer shaft 19 also forms an outwardly extending flange 41 to which the driven gear 42 is attached to co-act with the driving pinion 37 to transmit rotary motion from the clutch shaft to the transfer shaft. The rotative forces supplied by the power means 17 are transmitted through the drive shaft 20, the clutch shaft 21, the driving pinion 37 and the driven gear 42 to the transfer shaft 19.

A lateral drive means couples the transfer shaft to one of the tubular members whereby the high-torque forces transmitted by the transfer shaft are supplied to such tubular member. Preferably the lateral drive means comprises a continuous chain linkage 22 which connects from the rotatable jaws 23 (not shown in detail), such as are well known to those skilled in the art, to the sprocket 40 mounted on the transfer shaft 19. Preferably the chain linkage 22 partially encircles the transfer shaft 19 and connects to both sides of the gripping jaws 23, as is well known in the art, whereby high-torque forces may be supplied by the transfer shaft 19 to rotate the rotatable jaws 23 in either direction.

Figure 3:
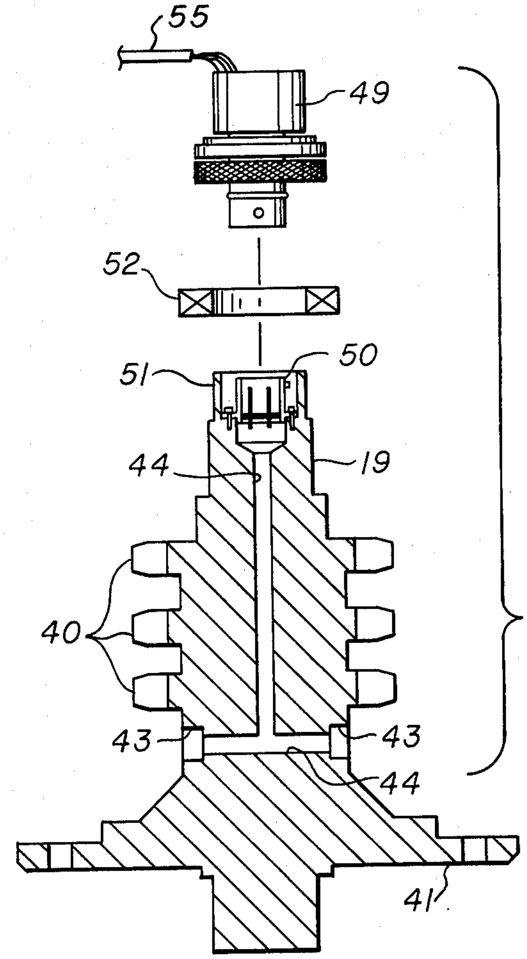
FIG. 3 is an exploded sectional view of the transfer shaft of the power tong apparatus showing the transducer assembly.

Referring still to both FIGS. 2 and 3, means are associated with the transfer shaft 19 for transducing the angular deformation of the transfer shaft 19 caused by torsion into an electrical signal representative thereof. As illustrated particularly in FIG. 3, the transducer means preferably are associated with the transfer shaft 19 intermediate the location at which the transfer shaft connects with the power means and the location at which the transfer shaft is coupled to the lateral drive means. In other words, the transducer means preferably are associated with the transfer shaft intermediate the flange 41 which bears the driven gear 42 and the location at which is mounted the sprocket 40 around which is secured the chain linkage 22. Preferably the transducer means constitute two diametrically opposed strain gauge installations, such as opposed pairs of strain gauges connected in a balanced bridge assembly, secured to the transfer shaft 19, which gauges generate electrical signals representative of the angular deformation, and thus the torque, of the transfer shaft. It is well known to those skilled in the art to utilize strain gauges or the like to determine the torque in a rotatable shaft. For example, numerous teachings of torque measuring devices for shafts are contained in the following U.S. Pat. Nos.: 2,073,394; 2,359,125; 2,365,564; 2,385,005; 2,403,952; 2,432,900; 2,681,564; 3,000,208; 3,295,367; 3,417,611; 2,423,620; 3,599,482; 3,710,874; and 3,823,607. Preferably transfer shaft 19 has two holes 43 counterbored therein diametrically opposite each other and a passage 44 is bored between the two holes and longitudinally along the axis of the transfer shaft 19 for providing communication between the two counterbored holes and a selected end of the transfer shaft. Preferably a pair of strain gauges (not shown), such as is well known to those skilled in the art, is mounted in each of the counterbored holes and secured to the transfer shaft. Preferably the passage 44 extends upwardly through the transfer shaft 19 to the end thereof opposite the end to which is secured flange 41.

As illustrated in FIGS. 2 and 3, a slip ring assembly is secured to the upper end of the transfer shaft 19 for conducting electrical signals supplied to it. Electrical conductors (not shown) connect the transducer means, that is, the strain gauges, to the slip ring assembly by extending from each strain gauge through the passage 44 to the slip ring assembly.

The slip ring assembly preferably includes a quick-disconnected electrical fitting 50 mounted in a counterbored hole at the top of the transfer shaft 19. An oil seal ring 51, against which rides an oil seal 52, forms the outside of the upper end of the transfer shaft 19 and mechanically protects the fitting. The slip ring assembly 49 is secured to the quick-disconnect electrical fitting 50. The quick-disconnect electrical fitting and the slip ring assembly may be any of numerous commercially available components well known to those skilled in the art. The entire slip ring assembly is protected from the elements by a slip ring housing 53 secured to a bearing cap 54. The slip rings allow continuous electrical contact from the static lead wires to the matching wires on the rotating transducer. Thus, the dynamically measured torque values are carried through the slip rings to the lead wires 55 which pass through the slip ring housing and to the digital display means 25. Suitable slip ring assemblies and strain gauge installations may be obtained from GSE, Inc., Farmington Hills, Mich.

The display means 25 is electrically connected to the slip ring assembly. The display means 25 receives electrical signals generated by the transducer means and responsive thereto displays the magnitude of torque experienced by the transfer shaft 19 at the measured location, which torque is responsive to and indicative of the torque supplied to the tubular members to make or break the connection. The display means may be any of numerous commercially available devices well known to those skilled in the art, such as a Model AN-2553 Mod 22 obtainable from Analogic Corporation, Wakefield, Mass.

It can now be observed that because the measurement of the torque is internal to the power tong apparatus, the presence or absence of a backup tool to hold the tubular members from rotating, the mounting of the power tong apparatus on its side for pipe yard work, or mounting of the power tong apparatus at an angle, as in slant hole work, makes no difference in the performance of the torque measuring ability of the apparatus. Thus, the improved power tong apparatus according to this invention accurately measures the amount of torque applied to make or break a connection between tubular members in a manner independent of the physical constraints and mounting of the power tong apparatus.

What is claimed is:

1. An apparatus for making or breaking connections between tubular members, comprising:

means for supplying motive forces;

an internally mounted transfer shaft coupled to the means for supplying motive forces whereby the motive forces are transformed into high-torque forces;

means coupled to the transfer shaft for transmitting the high-torque forces of the transfer shaft to the tubular members;

a slip ring assembly for conducting electrical signals secured to a selected end of the transfer shaft; and means associated with the internally mounted transfer shaft for determining the torque experienced by the transfer shaft whereby the torque applied by the apparatus to the tubular members is determined accurately independent of the physical constraints and mounting of the apparatus, such torque determining means including:

two holes counterbored in the transfer shaft diametrically opposite each other and a passage bored in the longitudinal axis of the transfer shaft providing communication between the two counterbored holes and the end of the transfer shaft onto which the slip ring assembly is secured;

a strain gauge installation is secured to the transfer shaft in each of the holes for transducing the angular deformation for the transfer shaft into an electrical signal representative thereof; and electrical conductors extend from the counterbored holes and through the passage and connect each strain gauge installation to the slip ring assembly for conducting the electrical signal external of the transfer shaft whereby the torque experienced by the transfer shaft can be externally displayed.

* * * * *